(No Model.)
E. ENGELS.
DEVICE FOR PROTECTING GAGE GLASS TUBES.
No. 409,280. Patented Aug. 20, 1889.
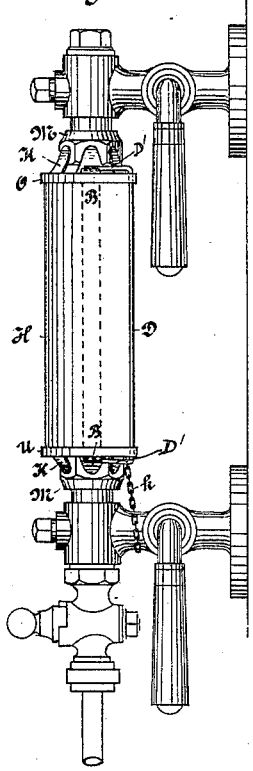
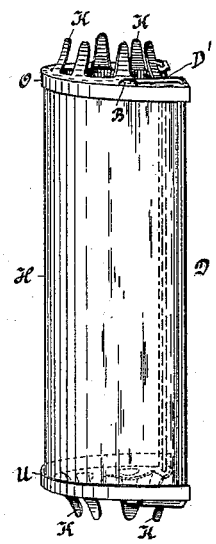
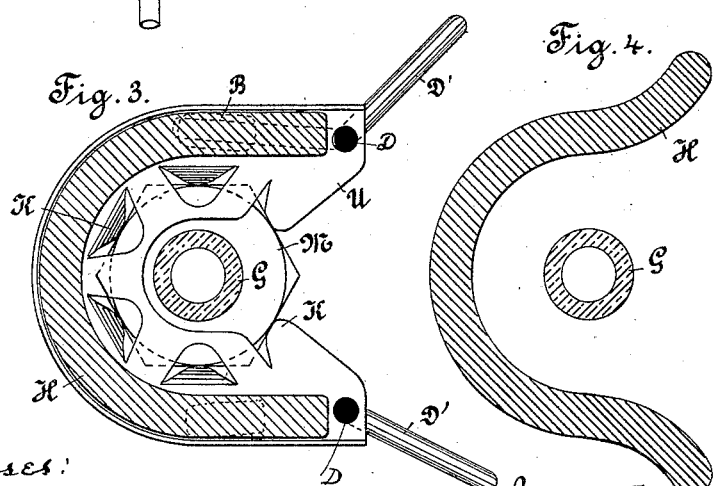

UNITED STATES PATENT OFFICE.

EMIL ENGELS, OF ENGELSKIRCHEN, NEAR COLOGNE, GERMANY.

DEVICE FOR PROTECTING GAGE-GLASS TUBES.

SPECIFICATION forming part of Letters Patent No. 409,280, dated August 20, 1889.

Application filed December 3, 1888. Serial No. 292,484. (No model.) Patented in Germany September 16, 1886, No. 39,068.

*To all whom it may concern:*

Be it known that I, EMIL ENGELS, a subject of the Emperor of Germany, residing at Engelskirchen, near Cologne, in Germany, have invented certain new and useful Improvements in Apparatus for the Protection of Gage-Glasses, (the same having been patented in Germany September 16, 1886, No. 39,068, and a patent of addition E 2,326, filed September 24, 1888,) of which the following is a specification.

The object of the present invention is to provide the gage-glasses of boilers with a casing which protects them against accidental breakage and also protects the engineer or fireman against injury in case the gage-glass should burst.

In the accompanying drawings, Figure 1 represents a side elevation of a gage-glass provided with the protecting-casing. Fig. 2 represents a perspective view of the protecting-casing on a larger scale. Fig. 3 represents a transverse section of the gage-glass with the casing. Fig. 4 represents a modified form of the casing.

The protecting-casing H, consisting of thick transparent glass, has a section in the form of a horseshoe, and its inner width is preferably about three times the diameter of the gage-glass G. The open side of the casing H is toward the boiler, so that the level of the water is observed through the casing and the gage-glass protected on three sides. The gage-glass is therefore protected against accidental breakage from outside, and cold drafts are prevented from coming in contact with the hot glass. Should, however, a gage-glass burst, the splinters and the steam, intermixed with boiling water, will be directed against the boiler, and the engineer or fireman can close the valves without fear of injury or scalding.

To fasten the glass casing round the gage-glass, the ends of the former are surrounded with metal shoes provided with noses or projections K, formed by suitably cutting the shoes and bending the cut parts outward. The lower shoe U is formed with a central opening, through which passes the gage-glass G, while the opening in the upper shoe O is so large that the nut M of the stuffing-box can pass through. In this manner the lower shoe U will rest on the lower stuffing-box nut M, which thus carries the whole apparatus. If the apparatus is to be removed, it is lifted, the upper stuffing-box nut M being able to pass through the opening of the upper shoe O. The casing H is held in position by the noses K being bent against the nuts M. The fitting and removing of the casing is therefore very simple.

The protecting-glass is preferably curved or horseshoe shaped, in order that no joints or other obstructing media need be employed which would prevent the gage from being seen from any point in front of the boiler, it being desirable to have one side of the glass open to permit the same to be removed as will be readily understood, and also to permit the steam, &c., to escape without breaking the protecting-glass should the gage-glass break the outwardly-turned edges, further permitting quick escape of steam and protecting the fireman's hands when turning the steam off.

In order to clamp the shoes and glass together and at the same time have the space in front of the glass clear, I employ two wires D, passing through the shoes at the rear edges of the glass, Figs. 1, 2, and 3, and having the ends D' bent at substantially right angles to rest against the outside of the shoes and press them against the glass with yielding pressure to permit of uneven expansion and also to allow of the ready removal of the glass itself. The bent ends of these wires are pressed over small enlargements B of the shoes to prevent the release of the shoes by the accidental turning of the wires. When the casing is to be removed, the bent ends of the wires D are turned away from the shoes. To prevent the apparatus from coming off accidentally, the lower ends of the wires are fastened to the lower valve by means of a chain $k$, passing over said ends, so that the apparatus cannot be removed unless the chain is unfastened. This protecting-casing is not only recommended for the gage-glasses of stationary boilers, but also especially for those of portable boilers and locomotives in which the jars and jerks may cause the gage-glass to break, in addition to the other causes.

Having now particularly described and ascertained the nature of my said invention and in what manner the same is to be performed, I declare that what I claim, is—

1. In apparatus for the protection of gage-glasses, a thick and transparent glass casing, such as H, having a section approximately of the form of a horseshoe, substantially as herein described and illustrated.

2. In apparatus for the protection of gage-glasses, a thick and transparent glass casing, such as H, having a section approximately of the form of a horseshoe with its ends turned slightly outward, substantially as herein described and illustrated.

3. The combination, with a gage-glass-protecting casing, of shoes, such as U O, provided with noses K for securing them to the gage-cocks, substantially as herein described and illustrated.

4. The combination, with a gage-glass, a protecting casing or glass having one side open to permit of its removal, and the shoes at the ends of said protecting-casings, of the wires D, having the bent ends for clamping the protecting casing or glass and shoes together, substantially as described.

5. As a new article of manufacture, the apparatus for protecting gage-glasses, consisting of a glass casing H, shoes U O, having noses K, and enlargements B, and wires D, and chain $k$, substantially as herein described and illustrated.

6. The combination, with a gage-glass, the protecting-casing having one side open to permit of its removal, and the shoes at the ends of said protecting-casing engaging the gage-glass fitting to hold the protecting-glass in place, of the wires D, passing through said shoes at the rear edges of the casing and having the bent ends engaging said shoes to clamp the casing and shoes together, substantially as described.

In testimony whereof I have hereto set my hand in the presence of two subscribing witnesses.

EMIL ENGELS.

Witnesses:
WM. D. WARNER,
M. ENGELS, Jr.